United States Patent [19]

Lew

[11] Patent Number: 5,070,736

[45] Date of Patent: Dec. 10, 1991

[54] DIFFERENTIAL PRESSURE SENSOR WITH READ-OUT DEVICE

[76] Inventor: Hyok S. Lew, 7890 Oak St., Arvada, Colo. 80005

[21] Appl. No.: 461,233

[22] Filed: Jan. 5, 1990

[51] Int. Cl.$^5$ ............................ G01L 7/04; G01L 9/02; G01L 9/12; G01L 13/02

[52] U.S. Cl. ............................................ 73/736; 73/704; 73/743; 73/753; 336/30; 338/40; 361/283

[58] Field of Search ................ 73/736, 733, 734, 735, 73/718, 719, 743, 704, 722, 753; 361/283; 338/40; 336/30

[56] References Cited

U.S. PATENT DOCUMENTS

| | | | |
|---|---|---|---|
| 1,340,198 | 5/1920 | Wilkinson | 73/736 |
| 1,729,178 | 9/1929 | Motheral | 73/736 |
| 2,850,901 | 9/1958 | Proctor | 73/736 |
| 3,013,233 | 12/1961 | Bourns | 73/736 |
| 3,048,040 | 8/1962 | Pegram | 73/736 |
| 3,095,745 | 7/1963 | Kirwan | 73/736 |
| 4,455,874 | 6/1984 | Paros | 73/704 |
| 4,541,283 | 9/1985 | Stuhlmann | 73/718 |

Primary Examiner—Ronald O. Woodiel

[57] ABSTRACT

A differential pressure sensor comprises a pair of bourdon tubes disposed in an arrangement wherein deflections of the two bourdon tubes resulting from fluid pressures connected thereto take place in two opposite directions and the deflective extremities of the two bourdon tubes are linked to one another by a linkage, which linkage is coupled to a transducer that converts the displacement of the linkage to an electrical parameter such as the ohmic resistance, capacitance, reluctance, or resonance frequency as a measure of differential values between two pressures respectively connected to the two bourdon tubes.

6 Claims, 2 Drawing Sheets

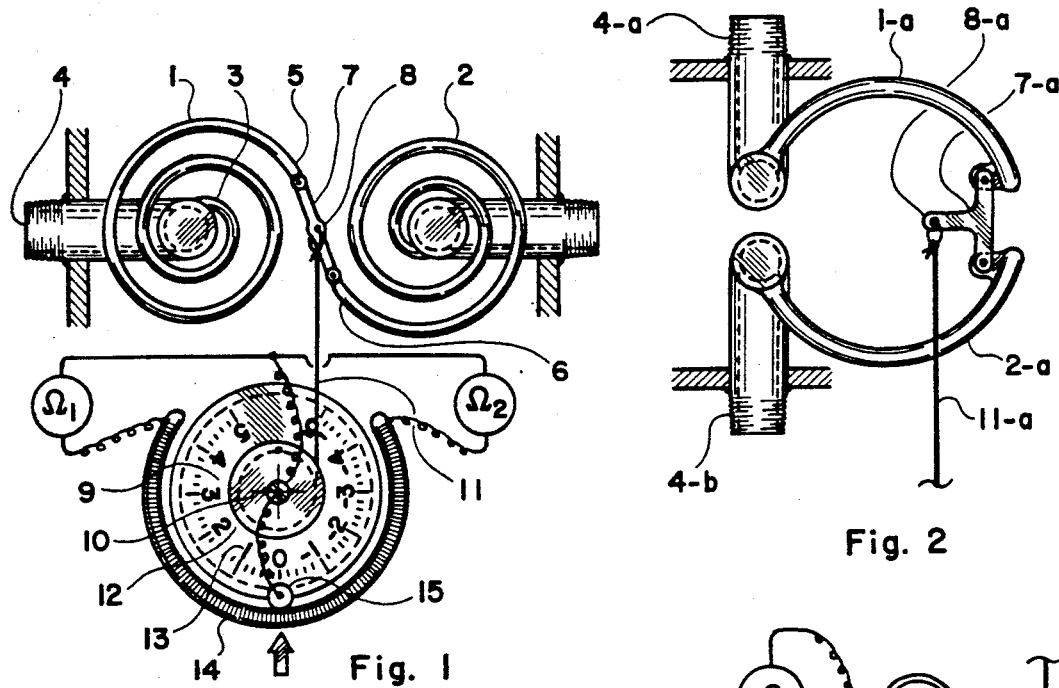
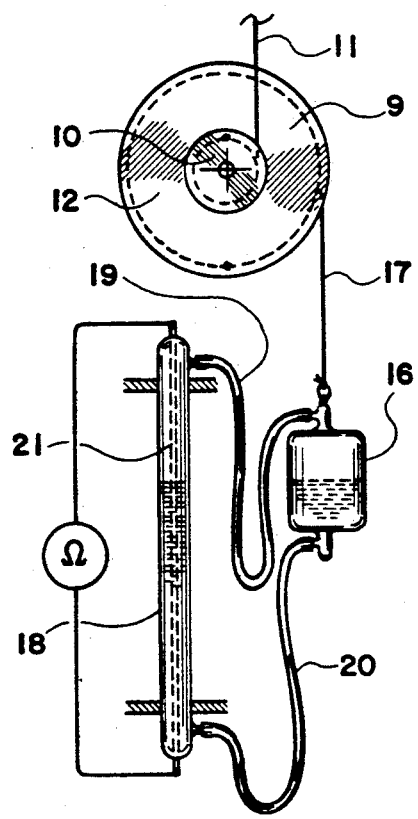
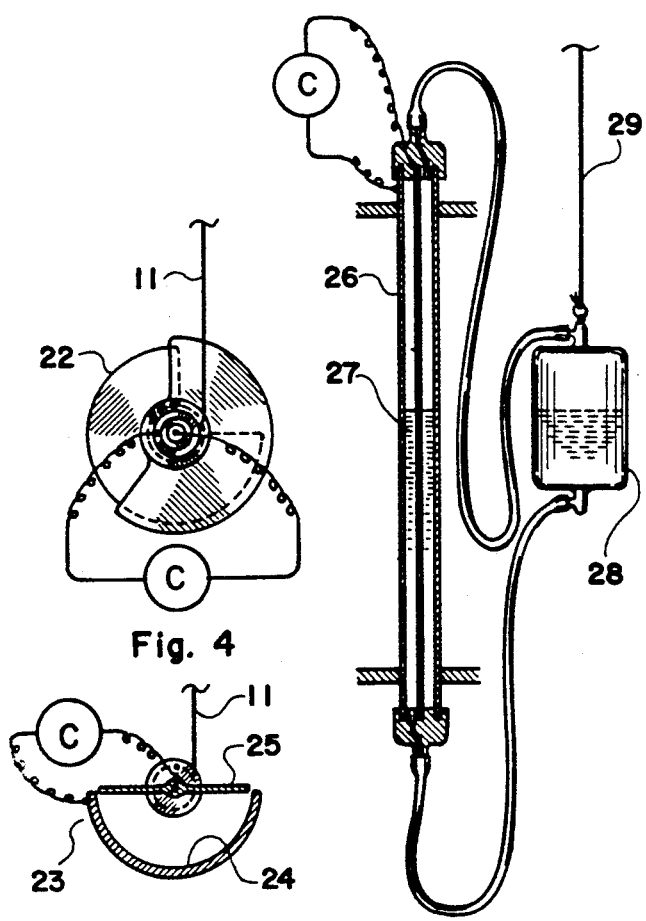
Fig. 1  Fig. 2  Fig. 3  Fig. 4  Fig. 5  Fig. 6

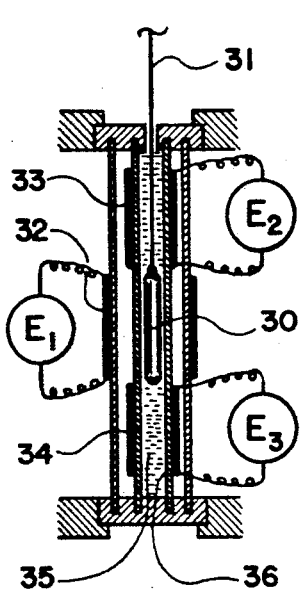
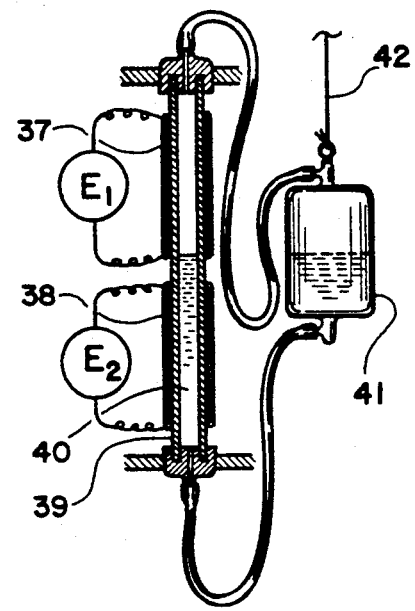
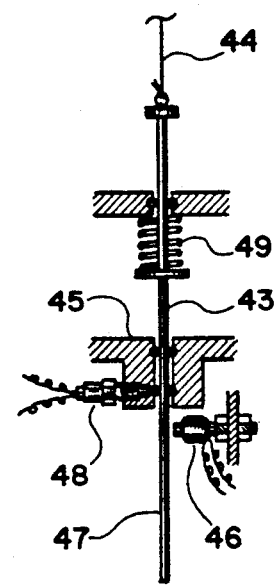
Fig. 7　　　Fig. 8　　　Fig. 9
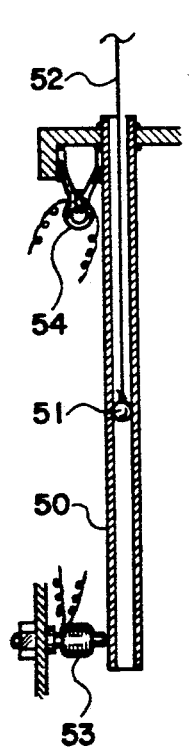
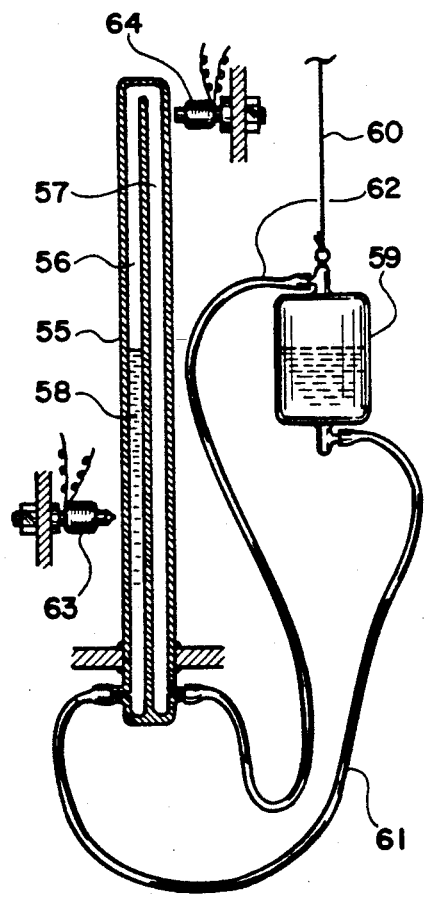
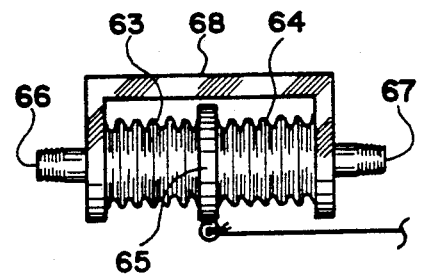
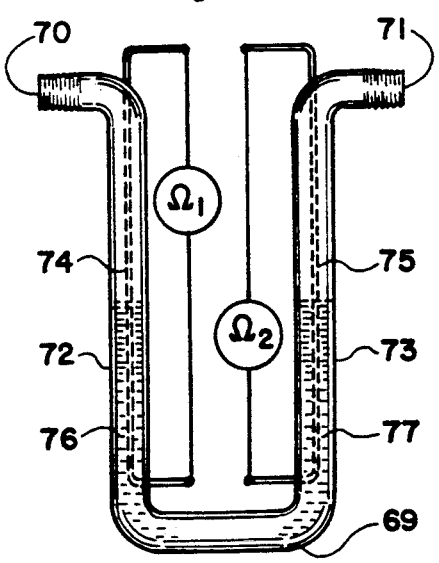
Fig. 10　　Fig. 11　　Fig. 12　　Fig. 13

DIFFERENTIAL PRESSURE SENSOR WITH READ-OUT DEVICE

BACKGROUND OF THE INVENTION

There are very broad applications in the industry for pressure measuring devices and, consequently, there has been a continuous effort among inventors, scientists and engineers to come up with a more accurate or more reliable or more versatile pressure sensor. A differential pressure sensor is used to measure the difference between two pressures respectively connected to the two pressure ports included therein. However, a differential pressure sensor can always be used to measure an absolute pressure or gauge pressure by connecting one of the two pressure ports to the pressure under measurement and the other to a vacuum or atmospheric pressure. In today's automated industries, many pressure measurement require a read-out in the form of electrical current or electromotive force, as the read-out must be fed into a data processing device or process control device in the form of an electrical signal. The time-proven old fashioned pressure sensors employing straight forward mechanical device such as a bourdon tube, bellow or manometric column have only visual read-out means such as a dial or scales with a few exceptions and, consequently, the pressure data obtained by those mechanical pressure sensors can not be fed into an electronic data processor or electrically operated control device. The so-called high-tech pressure sensors providing read-outs in the form of electrical signals, which can be directly fed into a data processor or control device, employ one or another form of electromechanical elements such as a resistive, capacitive or inductive element wherein the electrical characteristics thereof changes as a function of the pressure subjected thereby. While these types of high-tech pressure sensors have many advantages such as a compact volume and light weight, they also have some serious disadvantages. For example, many high-tech pressure sensors require a calibration that requires a temperature compensation or correction and, consequently, a temperature measuring device as well as a data processor carrying out the algorithm of the temperature compensated calibration must be included in the package of the pressure sensor, which makes these high-tech pressure sensor expensive in price and complex in operation. The old fashioned mechanical pressure gauges are the most inexpensive and reliable pressure measuring devices, which can provide many advantages over the high-tech pressure sensors in a very wide application only if those mechanical pressure gauges are equipped with an electronic read-out device.

BRIEF SUMMARY OF THE INVENTION

The primary object of the present invention is to provide a differential pressure sensor comprising a pair of bourdon tubes coupled to one another at deflective portions thereof, wherein the two bourdon tubes deflect to two opposite directions under pressurizations thereof and, consequently, a net amount of deflection of the two coupled bourdon tubes results in when the two pressures respectively connected to the two bourdon tubes are not equal.

Another object is to provide a differential pressure sensor including the two bourdon tubes, that has a read-out device providing the pressure data in a form of electrical signal.

A further object is to provide a differential pressure sensor comprising a pair of bellows coupled in a series arrangement, that has a read-out device providing the pressure data in a form of electrical signal.

Yet another object is to provide a manometer with a read-out device providing the pressure data in a form of electrical signal.

Yet a further object is to provide a position transducer that converts displacement experienced by a mechanical pressure sensing element to an electrical signal, which position transducer can be employed in the construction of pressure sensors, liquid level sensors, temperature sensors and flowmeters.

These and other objects of the present invention will become clear as the description thereof progresses.

BRIEF DESCRIPTION OF THE FIGURES

The present inventions may be described with a greater clarity and specifically by referring to the following figures:

FIG. 1 illustrates an embodiment of the combination of two bourdon tubes employed in the construction of a differential pressure sensor that has a visual and/or potentiometer read-out means.

FIG. 2 illustrates another embodiment of the combination of two bourdon tubes usable in the construction of a differential pressure sensor in place of the combination of the two bourdon tubes shown in FIG. 1.

FIG. 3 illustrates a liquid column ohmic resistance position sensor that converts the deflection of the two bourdon tubes shown in FIG. 1 or 2 to an electrical signal.

FIG. 4 illustrates a variable area plate capacitor that converts the deflection of the two bourdon tubes to an electrical signal.

FIG. 5 illustrates a variable distance plate capacitor that converts the deflection of the two bourdon tubes to an electrical signal.

FIG. 6 illustrates a coaxial tube capacitor including a variable height liquid column that converts the deflection of the two bourdon tubes to an electrical signal.

FIG. 7 illustrates an inductive or reluctive position sensor that can be coupled to the deflection of the two bourdon tubes as an electronic read-out device of the pressure sensor.

FIG. 8 illustrates a liquid column inductive or reluctive position sensor that can be coupled to the deflection of the two bourdon tubes as an electronic read-out device of the pressure sensor.

FIG. 9 illustrates a resonance frequency position sensor that can be coupled to the deflection of the two bourdon tubes as an electronic read-out device of the pressure sensor.

FIG. 10 illustrates another resonance frequency position sensor that converts the deflection of the two bourdon tubes to an electrical signal.

FIG. 11 illustrates a liquid column resonance frequency position sensor that can be used in converting the deflection of the two bourdon tubes to an electrical signal.

FIG. 12 illustrates a pair of bellows connected to one another in a series arrangement that can be employed in the construction of a differential pressure sensor in place of the two bourdon tubes shown in FIG. 1 or 2.

FIG. 13 illustrates an embodiment of the manometer employing the ohmic resistance liquid level indicators operating on the same principles as that of the embodiment shown in FIG. 3.

DESCRIPTION OF THE ILLUSTRATED EMBODIMENTS

In FIG. 1 there is illustrated an embodiment of the differential pressure sensor constructed in accordance with the principles of the present invention, which embodiment includes a pair of bourdon tubes 1 and 2. The bourdon tube is a curved thin walled tubing having a noncircular cross section with a fixed extremity 3 connected to a pressure port 4, wherein the over-hanging or free extremity 5 experiences a deflection as the curvature of the bourdon tube changes as a function of the pressure supplied to the pressure port 4. The deflective extremities 5 and 6 of the two bourdon tubes 1 and 2 are linked to one another by a linking member 7, wherein the two bourdon tubes are disposed on a common plane in an axisymmetric arrangement about an axis passing through the midsection 8 of the linking member 7 and perpendicular to the common plane whereon the two bourdon tubes 1 and 2 are disposed. The midsection 8 of the linking member 7 is coupled to a motion amplifying device 9 that includes a small diameter capstan or rotary member 10 winding and unwinding a cord 11 anchored to the midsection 8 of the linking member 7 and a large diameter capstan or rotary member 12, wherein the two capstans or rotary members 10 and 12 coaxially affixed to one another are rotatably supported and spring biased against rotary displacement from a reference position. The spring providing the spring bias is not shown in the particular illustration for the brevity thereof. In this particular illustrative embodiment, the read-out means of the pressure sensor is provided by the visual scales 13 appearing on the large diameter rotary member 12 an/or by the rotary potentiometer including an arcuate bar 14 with a high ohmic resistance wire wound thereon and a rolling contact 15 rotatably supported by the large diameter rotary member 12 and under a rolling contact with the arcuate bar 14. The relative position of the rolling contact 15 intermediate the two extremities of the arcuate bar 14 is obtained by measuring the ohmic resistance $\Omega_1$ between the first extremity of the arcuate bar 14 and the rolling contact 15 and the ohmic resistance $\Omega_2$ between the second extremity of the arcuate bar 14 and the rolling contact 15, as the difference between the two measured ohmic resistances $\Omega_1$ and $\Omega_2$ is proportional to the difference between the two arcuate distances from the rolling contact 15 to the two extremities of the arcuate bar 14 and independent of the contact ohmic resitance between the rolling contact 15 and the arcuate bar 14 that can vary in time and occasion. Therefore, the differential value between the two pressures respectively pressurizing the two bourdon tubes 1 and 2 can be expressed in terms of the two ohmic resistances $\Omega_1$ and $\Omega_2$, wherein the mathematical relationship therebetween can best be determined by empirical calibration procedure. In this particular illustrative embodiment, it is preferred to connect the higher pressure of the two pressures to the pressure port 4. It is self-evident that the larger diameter rotary member 12 may be replaced by a radially extending arm affixed to the small diameter rotary member 10 and including the rolling contact 15 at the extremity thereof, which arm points the scales 13 now appearing on a stationary disc disposed coaxially to the rotary member 10. In an alternative design, the midsection 8 of the linking member 7 may be coupled directly to a linear scale or linear potentiometer by a rigid connecting rod, whereby either of the two pressure ports included in the embodiment shown in FIG. 1 can receive the higher of the two pressures under measurment. In such an alternative design, the requirement of the spring bias returning the connecting rod to the zero or reference position can be omitted. It should be mentioned that the pair of bourdon tubes 1 and 2 disposed in an axisymmetric arrangement as shown in FIG. 1 or in a symmetric arrangement as shown in FIG. 2 are immune from any error arising from a temperature change, because whatever thermal expansion taking place in the system is cancelled between the two bourdon tubes and, consequently, there is no net deflection in the combination of the two bourdon tubes arising from thermal expansion or contraction.

In FIG. 2 there is illustrated another embodiment of the combination of two bourdon tubes usable in the construction of a differential pressure sensor in place of the combination of two bourdon tubes shown in FIG. 1. In this embodiment, a pair of bourdon tubes 1-a and 2-a are disposed in a symmetric arrangement about a hypothetical plane located therebetween and perpendicular to a plane whereon the two bourdon tubes are disposed, which contrasts the axisymmetric arrangement of the two bourdon tubes 1 and 2 shown in FIG. 1. The open ends of the two bourdon tubes 1-a and 2-a are respectively connected and anchored to two rigid pressure inlet conduits 4-a and 4-b, which are fixedly secured to a rigid support. The closed extremities of the two bourdon tubes 1-a and 2-a over-hanging from the fixed extremities are linked to one another by a linking member 7-a. The cord 11-a coupling the displacement of the linking member 7-a to a position sensor employed as an electronic read-out device is anchored to an over-hanging portion 8-a of the linking member 7-a, which arrangement enhances the displacement of the cord 11-a caused by the differential pressurizing of the two bourdon tubes 1-a and 2-a.

In FIG. 3 there is illustrated a liquid column potentiometer that can be employed as an electronic read-out device of the dual bourdon tube differential pressure sensor shown in FIGS. 1 or 2. A container 16 containing an electrically conducting liquid depends from a cord 17 winding on or unwinding from the large diameter rotary member 12 included in the motion amplifying device 9 coupled to the combination of two bourdon tubes shown in FIGS. 1 or 2. The top and bottom extremities of a nonhorizontally disposed tubing 18 with two closed ends are respectively connected to the top and bottom of the container 16 by a pair of highly flexible conduits 19 and 20, respectively. The tubing 18 includes an elongated ohmic resistor 21 with high specific ohmic resistance disposed parallel thereto and extending over the two extremities thereof. The displacement of the linking member 7 or 7-a respectively shown in FIGS. 1 or 2 changes the height of the column of the electrically conducting liquid in the tubing 18 and, consequently, changes the ohmic resistance between the two ends of the elongated resistor 21. Therefore, differential values between the two pressures can be expressed in terms of the ohmic resistance $\Omega$ between the two ends of the elongated resistor 21, wherein the mathematical relationship therebetween can best be determined empirically. It is self-evident that the cord 11 can be directly connected to the container 16 when there is no need for the motion amplifying device 9. The cord 11 or 17 can be connected to a conventional linear potentiometer in place of the liquid column potentiometer shown in FIG. 3.

In FIG. 4 there is illustrated an embodiment of the variable area plate capacitor 22 that is rotated to one direction by the axial displacement of the cord 11 away from the capacitor 22 and to another opposite direction by a rotary spring bias force. The capacitance C of the variable capacitor 22 changes as a function of the displacement of the linking member linking the two bourdon tubes. As a consequence, the differential pressure can be expressed in terms of the capacitor C, wherein the mathematical relationship therebetween can best be determined empirically.

In FIG. 5 there is illustrated an embodiment of the variable distance plate capacitor 23, which includes a stationary semicircular cylindrical shell plate 24 and a flat plate 25 rotating with a capstan or rotary member 10 shown in FIG. 1, that is rotated to one direction by the tension of the cord 11 and to another opposite direction by a rotary spring bias which is not shown. The capacitance C of the variable capacitor 23 becomes a measure of the differential pressure value, wherein the mathematical relationship therebetween can best be determined empirically.

In FIG. 6 there is illustrated a coaxial cylindrical shell capacitor 26 that has a fixed area of and fixed separation distance between the capacitor plates, wherein the space between the capacitor plates is filled with a dielectric liquid column 27 supplied from a container 28 depending from a cord 29 coupled to the displacement of the linking member directly or through a motion-amplifying device such as the element 9 shown in FIG. 3. The height of the dielectric liquid column 27 changes the capacitance C of the capacitor. Therefore, the capacitance C becomes a measure of the differential pressure value, wherein the mathematical relationship therebetween can best be determined empirically.

In FIG. 7 there is illustrated an inductive or reluctive position sensor that can be used as an electronic read-out device in conjunction with the dual bourdon tube pressure sensor shown in FIGS. 1 or 2. A movable ferromagnetic core 30 is coupled to the displacement of the linking member 7 or 7-a shown in FIGS. 1 or 2 directly or through a motion-amplifying device by a cord 31. An alternating input emf $E_1$ energizing a first induction coil 32 produces two alternating output emf's $E_2$ and $E_3$ respectively from two induction coils 33 and 34 by mutual induction. The relative position of the ferromagnetic core with respect to the midsection of the combination of induction coils 32, 33 and 34, wherein the output coils 33 and 34 are disposed symmetrically about the input coil 32, can be expressed in terms of $E_2/E_1$ and $E_3/E_1$. As a consequence, the differential pressure value can be expressed in terms of the emf ratios $E_2/E_1$ and $E_3/E_1$, wherein the mathematical relationship therebetween can be best determined empirically. For measurements of small values of the differential pressure that involves a weak force causing the displacement of the linking member, the interior space 35 of the nonmagnetic and non conducting tubing 36, on which the output coils 33 and 34 are wound, may be filled with a liquid, whereby a bouyancy force counteracting the weight of the ferromagnetic core 30 enables the weak force causing displacement of the linking member to raise and lower the ferromagnetic core 30.

In FIG. 8 there is illustrated a liquid column inductive or reluctive position sensor that can be used as an electronic read-out device in conjunction with the dual bourdon tube pressure sensor shown in FIGS. 1 or 2. Input and output induction coils 37 and 38 are respectively wound on two halves of a nonmagnetic and nonconducting tubing 39 that includes a ferromagnetic liquid column 40 supplied by a container 41 depending from a cord 42 coupled to the displacement of the linking member 7 or 7-a shown in FIGS. 1 or 2 directly or through a motion-amplifying device. The ratio of output emf $E_2$ to input emf $E_1$ becomes a measure of the height of the liquid column and, consequently, the differential pressure value can be expressed in terms of the emf ratio $E_2/E_1$, wherein the mathematical relationship therebetween should be determined empirically.

In FIG. 9 there is illustrated an embodiment of the resonance frequency position sensor that can be employed as a read-out device in the construction of the dual bourdon tube pressure sensor. A stiff elongated member 43 suspended by the cord 44 coupled to the displacement of the linking member directly or through a motion-amplifying device is supported by a rigid support 45 in a slidable arrangement. An electromagnetic vibrator 46 induces a natural flexural vibration of a section 47 of the elongated member 43 extending beyond the rigid support 45 and a motion detector 48 detects the natural frequency thereof. The displacement of the linking member can be expressed in terms of the natural frequency of the over-hanging section of the elongated member and, consequently, the differential pressure value can be expressed in terms of the natural frequency of the over-hanging section of the elongated member wherein the mathematical relationship therebetween can be best determined empirically. The elongated member 43 returns to the zero or reference position by its own weight or by a spring bias force provided by a coil spring 49. It can be readily recognized that, instead of coupling the lengthwise sliding movement of the elongated member 43 to the displacement of the linking member 7 or 7-a shown in FIGS. 1 or 2, the elongated member 43 can be fixedly supported at one extremity thereof and the supporting structure sliding on the elongated member can be coupled to the displacement of the linking member, which combination provides the same end result as the embodiment shown in FIG. 8.

In FIG. 10 there is illustrated another embodiment of the resonance frequency position sensor that can be used as a read-out device in the construction of the dual bourdon tube pressure sensor. A stiff elongated tubular member 50 fixedly secured to a rigid support at one extremity thereof includes a mass 51 such as a metallic sphere depending from a cord 52 coupled to the displacement of the linking member 7 or 7-a shown in FIGS. 1 or 2 directly or through a motion-amplifying device. The cross section of the mass 51 is closely matched to the internal cross section of the elongated tubular member 50 in such a way that the mass 51 is slidable along the length of the elongated tubular member 50 while little relative lateral movement therebetween is allowed. The electromagnetic vibrator 53 induces a natural flexural vibration of the elongated tubular member 50 and the motion sensor 54 detects the natural frequency thereof. The differential pressure value is measured in terms of the natural frequency of the flexural vibration of the elongated tubular member. It should be mentioned that the elongated tubular member 50 can be replaced by an elongated rod and the spherical mass 51 can be replaced by an annular mass sliding on the elongated rod.

In FIG. 11 there is illustrated a further embodiment of the resonance frequency position sensor that can be employed as a read-out devide in the construction of the dual bourdon tube pressure sensors. A stiff elongated member 55 includes a pair of parallel elongated cavities 56 and 57 disposed in the lengthwise direction thereof, wherein the two elongated cavities 56 and 57 are connected to one another at the upper extremities thereof. The elongated cavity 56 includes a liquid column 58 supplied from a liquid medium container 59 depending from a cord 60 coupled to the displacement of the linking member 7 or 7-a shown in FIGS. 1 or 2 directly or through a motion amplifying device. The bottom ends of the two elongated cavities 56 and 57 are respectively connected to the top and bottom of the liquid medium container 59 by a pair of highly flexible conduits 61 and 62, respectively. A motion sensor 63 detects the natural frequency of the flexural vibration of the elongated member 58, that is induced by an electromagnetic vibrator 64. It should be mentioned that the assemblies shown in FIGS. 2, 5, 7 and 9 can be immersed in another fluid medium, whereby the bouyancy force acting on the liquid container counteracts the weight thereof and, consequently, minimizes the load that has to be carried by the displacement of the linking member 7 or 7-a shown in FIGS. 1 or 2 resulting from a differential pressure. Such an arrangement is particularly useful for measuring differential pressures with small values.

In FIG. 12 there is illustrated a mechanical assembly of a differential pressure sensing element, which can be used in place of the combination of dual bourdon tubes shown in FIGS. 1 or 2 in the construction of a differential pressure sensor, of which operating principles are described in conjunction with FIGS. 1–11. A pair of bellows 63 and 64 with sealed ends are connected to one another in series by linking member 65, wherein the two extremities of the combination of the two bellows respectively including two pressure ports 66 and 67 are anchored to a rigid support 68. In replacing the combination of the dual bourdon tubes 1 and 2 shown in FIGS. 1 or 1-a and 2-a shown in FIG. 2 with the combination of the twin bellows 63 and 64, the cords or connecting rods previously coupled to the displacement of the linking member 7 or 7-a shown in FIGS. 1 or 2 is now coupled to the displacement of the linking member 65, which displacement takes place in a direction parallel to the central axis of the combination of the two bellows 63 and 64.

In FIG. 13 there is illustrated another differential pressure measuring device. The manometer has a U-shaped conduit 69 with two extremities respectively including two pressure ports 70 and 71. Each of the two legs 72 and 73 of the U-shaped conduit includes an elongated member with a high specific ohmic resistance 74 or 75 extending from one to the other extremities thereof. The U-shaped conduit 69 is made of electrically nonconducting material. The ohmic resistance across the two extremities of the high ohmic resistance elongated member 74 or 75 varies as a function of the hight of an electrically conducting liquid column 76 or 77 and, consequently the difference in the hight between the two liquid columns 76 and 77 can be measured by the difference in the ohmic resistances $\Omega_1$ and $\Omega_2$ respectively existing across the two extremities of the two high ohmic resistance elongated members 74 and 75.

It can be readily recognized that another embodiment of the manometer can be constructed by incorporating the coaxial capacitor shown in FIG. 6 into each of the two legs of the U-shaped conduit. A further embodiment of the manometer can be constructed by incorporating the pair of inductive coils shown in FIG. 8 into each of the two legs of the U-shaped conduit, wherein the liquid providing the liquid columns must be a magnetically active liquid. Still another embodiment of the manometer can be constructed by incorporating the dual elongated cavities shown in FIG. 11 into each of the two legs of the U-shaped conduit, wherein the first two elongated cavities holding the liquid columns respectively included in the two legs are connected to one another at the U-shaped bottom of the manometer, while the second two elongated cavities respectively included in the two legs are connected to the two pressure sources under measurement, respectively.

While the principles of the present inventions have now been made clear by the illustrative embodiments, there will be many modifications of the structures arrangements, proportions, elements and materials obvious to those skilled in the art, which are particularly adapted to the specific working environments and operating conditions in the practice of the inventions without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention, in which an exclusive property or priviledge is claimed, are defined as follows:

1. A device for measuring differential pressure comprising in combination:
   a) a pair of curved tubings of identical geometry disposed on a hypothetical plane in a mirror image to one another, each of the pair of tubings including a first closed end and a second open end with means for connecting a conduit thereto, wherein the first closed ends are spaced from one another and the second open ends are anchored to a support member;
   b) a rigid coupling member with first extremity connected to the first closed end of one of the pair of curved tubings in a pivotable arrangement about an axis generally perpendicular to said hypothetical plane and second extremity connected to the first closed end of the other of the pair of curved tubings in a pivotable arrangement about an axis generally perpendicular to said hypothetical plane, said rigid coupling member including an extension extending in a direction generally perpendicular to a line connecting the two first closed ends of the pair of curved tubings and generally parallel to said hypothetical plane, wherein the rigid coupling member is substantially free of any constraint limiting displacement thereof; and
   c) means for determining position of said extension of the rigid coupling member as a measure of difference between two pressures respectively contained in the pair of curved tubings.

2. A combination as set forth in claim 1 wherein said means comprises visual means varying as a functioning of position of the extension of said rigid coupling member.

3. A combination as set forth in claim 1 wherein said means comprises at least one variable ohmic resistor with ohmic resistance varying as a function of position of the extension of said rigid coupling member.

4. A combination as set forth in claim 1 wherein said means comprises at least one variable capacitor with capacitance varying as a function of position of the extension of said rigid coupling member.

5. A combination as set forth in claim 1 wherein said means comprises at least a pair of induction coils with variable mutual inductance therebetween varying as a function of position of the extension of said rigid coupling member.

6. A combination as set forth in claim 1 wherein said means comprises an elongated member with a variable natural frequency of flexural vibration varying as a function of position of the extension of said rigid coupling member.

* * * * *